(12) United States Patent
Sun et al.

(10) Patent No.: US 12,227,706 B2
(45) Date of Patent: Feb. 18, 2025

(54) TWO STAGE CATALYTIC PROCESS FOR MIXED PYROLYSIS OIL UPGRADING TO BTEX

(71) Applicants: Saudi Arabian Oil Company, Dhahran (SA); SABIC Global Technologies B.V., Bergen op Zoom (NL)

(72) Inventors: Miao Sun, Dhahran (SA); Sohel K. Shaikh, Dhahran (SA); Wojciech Andrzej Supronowicz, Riyadh (SA); Chandrasekar Subramani, Al Jubail (SA); Eman Z. Albaher, Qatif (SA)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 57 days.

(21) Appl. No.: 18/046,034

(22) Filed: Oct. 12, 2022

(65) Prior Publication Data

US 2024/0124789 A1    Apr. 18, 2024

(51) Int. Cl.
*C10G 69/04* (2006.01)
*B01J 21/04* (2006.01)
(Continued)

(52) U.S. Cl.
CPC .............. *C10G 69/04* (2013.01); *B01J 21/04* (2013.01); *B01J 23/83* (2013.01); *B01J 29/045* (2013.01);
(Continued)

(58) Field of Classification Search
CPC ........ C10G 69/04; C10G 11/14; C10G 45/68; C10G 47/20; C10G 2300/70;
(Continued)

(56) References Cited

U.S. PATENT DOCUMENTS 10,751,709 B1    8/2020   Sun et al.
10,751,710 B1    8/2020   Sun
(Continued)

FOREIGN PATENT DOCUMENTS

| CN | 107297224 A | * | 10/2017 | ............ B01J 27/188 |
| WO | 2021086632 A1 | | 5/2021 | |
| WO | 2022200164 A1 | | 9/2022 | |

OTHER PUBLICATIONS

Notification of Transmittal of the International Search Report and the Written Opinion of the International Searching Authority, or the Declaration dated Nov. 27, 2023 pertaining to International application No. PCT/US2023/031160 filed Aug. 25, 2023, pp. 1-11.

*Primary Examiner* — Randy Boyer
*Assistant Examiner* — Juan C Valencia
(74) *Attorney, Agent, or Firm* — DINSMORE & SHOHL LLP

(57) ABSTRACT

In accordance with one or more embodiments of the present disclosure, a multi-stage process for upgrading a mixed pyrolysis oil comprising polyaromatic compounds to benzene, toluene, ethylbenzene, and xylenes (BTEX) includes combining light pyrolysis oil with heavy pyrolysis oil to form the mixed pyrolysis oil; upgrading the mixed pyrolysis oil in a slurry-phase reactor zone to produce intermediate products, wherein the slurry-phase reactor zone comprises a mixed metal oxide catalyst; and hydrocracking the intermediate products in a fixed-bed reactor zone to produce the BTEX, wherein the fixed-bed reactor zone comprises a mesoporous zeolite-supported metal catalyst.

19 Claims, 2 Drawing Sheets

(51) Int. Cl.
    *B01J 23/83* (2006.01)
    *B01J 29/04* (2006.01)
    *C10G 11/14* (2006.01)
    *C10G 45/68* (2006.01)
    *C10G 47/20* (2006.01)

(52) U.S. Cl.
    CPC .............. *C10G 11/14* (2013.01); *C10G 45/68* (2013.01); *C10G 47/20* (2013.01); *C10G 2300/70* (2013.01); *C10G 2400/30* (2013.01)

(58) Field of Classification Search
    CPC .... C10G 2400/30; C10G 49/02; C10G 69/06; C10G 65/12; B01J 21/04; B01J 23/83; B01J 29/045
    See application file for complete search history.

(56) References Cited

U.S. PATENT DOCUMENTS

| | | |
|---|---|---|
| 10,835,894 B1 | 11/2020 | Sun et al. |
| 10,870,106 B1 | 12/2020 | Sun |
| 10,953,396 B2 | 3/2021 | Sun et al. |
| 11,027,271 B2 | 6/2021 | Sun |
| 11,091,709 B2 | 8/2021 | Xu et al. |
| 11,123,725 B2 | 9/2021 | Sun et al. |
| 11,130,119 B2 | 9/2021 | Sun |
| 11,220,637 B2 | 1/2022 | Xu et al. |
| 11,377,400 B1 * | 7/2022 | Sun .......................... B01J 29/26 |
| 11,384,297 B1 | 7/2022 | Sun et al. |
| 2019/0127646 A1 * | 5/2019 | Wong ....................... B01J 29/46 |

* cited by examiner

TWO STAGE CATALYTIC PROCESS FOR MIXED PYROLYSIS OIL UPGRADING TO BTEX

TECHNICAL FIELD

Embodiments of the present disclosure generally relate to petroleum products, and pertain particularly to a process for upgrading a mixed pyrolysis oil.

BACKGROUND

In a typical hydrocarbon thermal cracking process, a stream, called pyrolysis oil, exits as a bottom layer from the steam cracker. Pyrolysis oils vary from heavy to light liquids, based on different steam cracker feeds. There are two major sources of pyrolysis oil: heavy pyrolysis oil exiting from a naphtha steam cracker; and light pyrolysis oil exiting from a gas stream cracker.

Both heavy pyrolysis oil and light pyrolysis oil are low in sulfur content but rich in aromatic content. Although these properties may make pyrolysis oil a desirable feedstock for subsequent chemical conversions, traditional upgrading processes for pyrolysis oils are complex and inefficient.

SUMMARY

Both heavy pyrolysis oil and light pyrolysis oil are normally burned as fuel and not viewed as being of high value. However, with a high amount of aromatics, the relatively cheap pyrolysis oils would be an ideal feedstock for the production of valuable intermediate petrochemicals, such as benzene, toluene, ethylbenzene, and xylenes (BTEX). The BTEX can be then treated to maximize paraxylene, which is a critical building block to produce Purified Terephthalic Acid (PTA), and ultimately polyester. There is, therefore, a continual need for novel upgrading processes for pyrolysis oils that are simplified and more efficient. Embodiments of the present disclosure are directed to such processes.

According to one embodiment, a multi-stage process for upgrading a mixed pyrolysis oil comprising polyaromatic compounds to benzene, toluene, ethylbenzene, and xylenes (BTEX) is provided. The process includes combining light pyrolysis oil with heavy pyrolysis oil to form the mixed pyrolysis oil; upgrading the mixed pyrolysis oil in a slurry-phase reactor zone to produce intermediate products, wherein the slurry-phase reactor zone comprises a mixed metal oxide catalyst; and hydrocracking the intermediate products in a fixed-bed reactor zone to produce the BTEX, wherein the fixed-bed reactor zone comprises a mesoporous zeolite-supported metal catalyst.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

DETAILED DESCRIPTION

Figure 1:
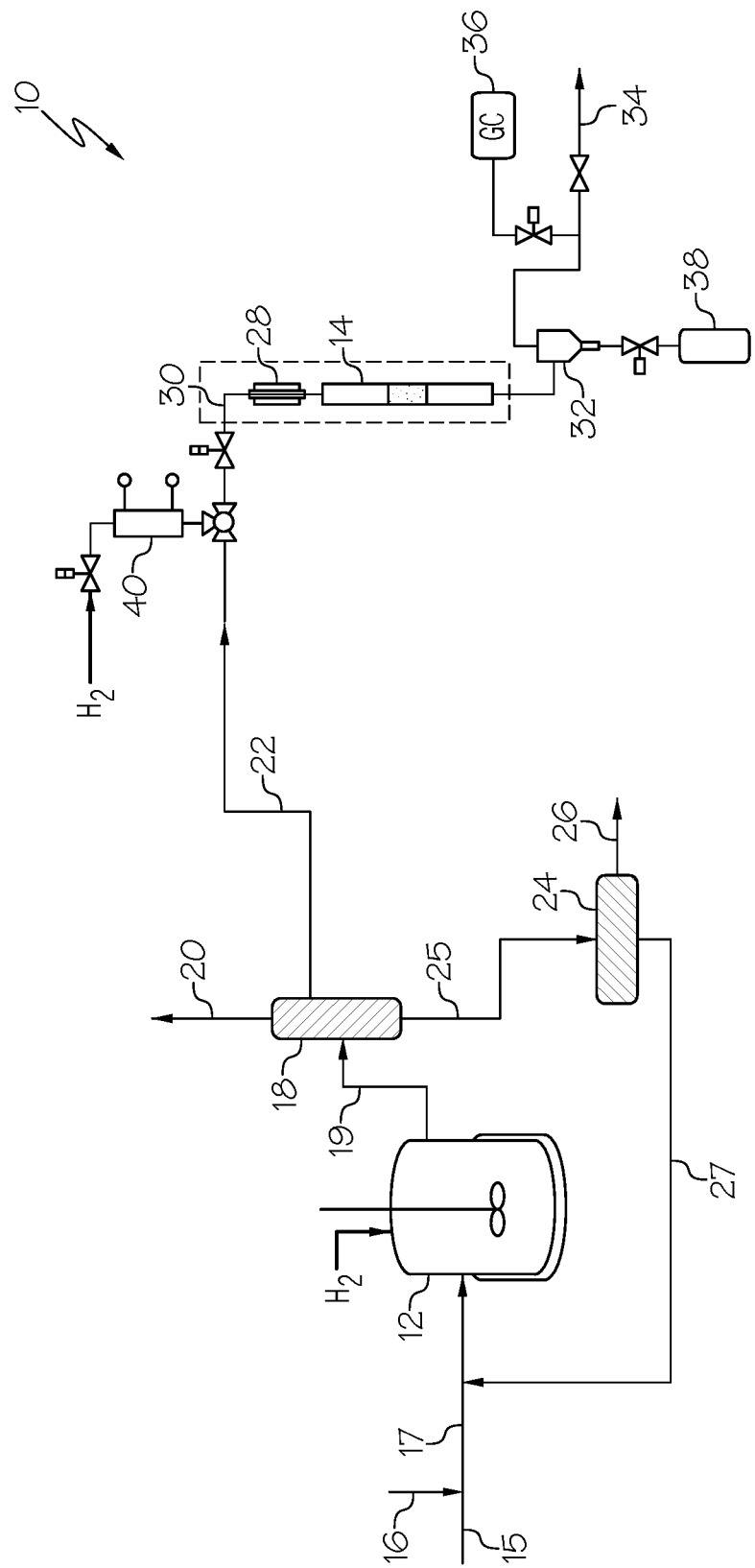
FIG. 1 is diagrammatic view of a system for producing BTEX from a mixed pyrolysis oil feed in accordance with embodiments disclosed herein.

As used herein, the term "light pyrolysis oil" refers to a stream with a composition equivalent to a stream exiting the bottom layer of a gas steam cracker. In some embodiments, all or part of the stream exiting the bottom layer of the gas steam cracker may be further processed. In some embodiments, the stream exiting the bottom layer of the gas steam cracker may be further processed at a hydrogenation unit and separated to produce one or more processed streams. In some embodiments, light pyrolysis oil has an initial boiling point of from 30° C. to 150° C., from 40° C. to 120° C., from 40° C. to 100° C., from 40° C. to 90° C., from 50° C. to 90° C., from 60° C. to 90° C., from 70° C. to 90° C., from 75° C. to 85° C., or from 75° C. to 80° C. According to one or more embodiments, light pyrolysis oil has a final boiling point of from 120° C. to 450° C., from 150° C. to 450° C., from 200° C. to 450° C., from 250° C. to 450° C., from 200° C. to 450° C., from 250° C. to 450° C., from 300° C. to 400° C., or from 325° C. to 375° C. According to one or more embodiments, light pyrolysis oil comprises paraffins, BTEX, mono-aromatics, naphthalenes, indenes, mono-naphthenes, and dicyclopentadiene (DCPD). In some embodiments, light pyrolysis oil does not comprise polyaromatics as defined herein. According to one or more embodiments, light pyrolysis oil comprises paraffins at a concentration of from 1 wt. % to 30 wt. %, from 1 wt. % to 20 wt. %, from 2 wt. % to 20 wt. %, from 2 wt. % to 15 wt. %, from 3 wt. % to 15 wt. %, from 5 wt. % to 15 wt. %, or from 5 wt. % to 10 wt. %. In some embodiments, light pyrolysis oil comprises BTEX at a concentration of from 1 wt. % to 20 wt. %, from 1 wt. % to 15 wt. %, from 2 wt. % to 15 wt. %, from 1 wt. % to 10 wt. %, from 2 wt. % to 10 wt. %, from 2 wt. % to 8 wt. %, from 2 wt. % to 6 wt. %, or from 2 wt. % to 5 wt. %. According to embodiments, light pyrolysis oil comprises mono-aromatics at a concentration of from 10 wt. % to 90 wt. %, from 15 wt. % to 90 wt. %, from 20 wt. % to 90 wt. %, from 20 wt. % to 85 wt. %, from 25 wt. % to 85 wt. %, from 30 wt. % to 85 wt. %, from 35 wt. % to 85 wt. %, from 40 wt. % to 85 wt. %, from 40 wt. % to 80 wt. %, from 45 wt. % to 75 wt. %, from 50 wt. % to 70 wt. %, or from 55 wt. % to 65 wt. %. In some embodiments, light pyrolysis oil comprises naphthalenes at a concentration of from 1 wt. % to 15 wt. %, from 2 wt. % to 15 wt. %, from 1 wt. % to 10 wt. %, from 2 wt. % to 10 wt. %, from 1 wt. % to 8 wt. %, from 1 wt. % to 6 wt. %, from 2 wt. % to 6 wt. %, or from 2 wt. % to 5 wt. %. According to one or more embodiments, light pyrolysis oil comprises indenes at a concentration of from 1 wt. % to 30 wt. %, from 1 wt. % to 20 wt. %, from 2 wt. % to 20 wt. %, from 2 wt. % to 15 wt. %, from 5 wt. % to 15 wt. %, or from 8 wt. % to 12 wt. %. In some embodiments, light pyrolysis oil comprises mono-naphthenes at a concentration of from 1 wt. % to 15 wt. %, from 2 wt. % to 15 wt. %, from 1 wt. % to 10 wt. %, from 2 wt. % to 10 wt. %, from 1 wt. % to 8 wt. %, from 1 wt. % to 6 wt. %, from 2 wt. % to 6 wt. %, or from 2 wt. % to 5 wt. %. According to one or more embodiments, light pyrolysis oil comprises DCPD at a concentration of from 1 wt. % to 60 wt. %, 1 wt. % to 50 wt. %, 1 wt. % to 40 wt. %, 1 wt. % to 30 wt. %, from 1 wt. % to 20 wt. %, from 2 wt. % to 20 wt. %, from 2 wt. % to 15 wt. %, from 5 wt. % to 15 wt. %, or from 8 wt. % to 12 wt. %. In some embodiments, light pyrolysis oil comprises from 3 wt. % to 15 wt. % paraffins, from 2 wt. % to 8 wt. % BTEX, from 40 wt. % to 80 wt. % mono-aromatics, from 1 wt. % to 6 wt. % naphthalenes, from 5 wt. % to 15 wt. % indenes, from 1 wt. % to 6 wt. % mono-naphthenes, and from 5 wt. % to 15 wt. % DCPD.

As used herein, the term "heavy pyrolysis oil" refers to a stream with a composition equivalent to a stream exiting the bottom layer of a naphtha steam cracker. In some embodiments, all or part of the stream exiting the bottom layer of the naphtha steam cracker may be further processed. In some embodiments, the stream exiting the bottom layer of the naphtha steam cracker may be further processed at a hydrogenation unit and separated to produce one or more processed streams. In some embodiments, heavy pyrolysis oil has an initial boiling point of from 90° C. to 250° C., from 100° C. to 200° C., from 110° C. to 190° C., from 120° C. to 180° C., from 130° C. to 170° C., or from 140° C. to 160° C. According to one or more embodiments, heavy pyrolysis oil has a final boiling point of from 500° C. to 950° C., from 500° C. to 900° C., from 550° C. to 850° C., from 600° C. to 800° C., from 650° C. to 750° C., or from 700° C. to 750° C. In some embodiments, heavy pyrolysis oil comprises mono-aromatics, di-aromatics, tri-aromatics, tetra-aromatics, penta-aromatics, hexa-aromatics, and hepta and greater aromatics. According to one or more embodiments, heavy pyrolysis oil comprises mono-aromatics at a concentration of from 1 wt. % to 50 wt. %, from 1 wt. % to 40 wt. %, from 2 wt. % to 40 wt. %, from 5 wt. % to 40 wt. %, from 5 wt. % to 35 wt. %, from 5 wt. % to 30 wt. %, from 10 wt. % to 30 wt. %, from 10 wt. % to 25 wt. %, from 15 wt. % to 25 wt. %, or from 15 wt. % to 20 wt. %. In some embodiments, heavy pyrolysis oil comprises di-aromatics at a concentration of from 2 wt. % to 50 wt. %, from 5 wt. % to 50 wt. %, from 5 wt. % to 45 wt. %, from 10 wt. % to 40 wt. %, from 15 wt. % to 45 wt. %, from 20 wt. % to 40 wt. %, from 20 wt. % to 35 wt. %, from 25 wt. % to 35 wt. %, or from 25 wt. % to 30 wt. %. According to one or more embodiments, heavy pyrolysis oil comprises tri-aromatics at a concentration of from 1 wt. % to 20 wt. %, from 1 wt. % to 15 wt. %, from 2 wt. % to 15 wt. %, from 1 wt. % to 10 wt. %, from 2 wt. % to 10 wt. %, from 2 wt. % to 8 wt. %, from 3 wt. % to 7 wt. %, or from 4 wt. % to 6 wt. %. In some embodiments, heavy pyrolysis oil comprises tetra-aromatics at a concentration of from 1 wt. % to 20 wt. %, from 1 wt. % to 15 wt. %, from 2 wt. % to 15 wt. %, from 1 wt. % to 10 wt. %, from 2 wt. % to 10 wt. %, from 2 wt. % to 8 wt. %, from 3 wt. % to 7 wt. %, or from 4 wt. % to 6 wt. %. According to one or more embodiments, heavy pyrolysis oil comprises penta-aromatics at a concentration of from 1 wt. % to 30 wt. %, from 1 wt. % to 20 wt. %, from 2 wt. % to 20 wt. %, from 2 wt. % to 15 wt. %, from 5 wt. % to 15 wt. %, from 8 wt. % to 12 wt. %, or from 8 wt. % to 10 wt. %. In some embodiments, heavy pyrolysis oil comprises hexa-aromatics at a concentration of from 1 wt. % to 30 wt. %, from 1 wt. % to 20 wt. %, from 2 wt. % to 20 wt. %, from 2 wt. % to 15 wt. %, from 5 wt. % to 15 wt. %, or from 8 wt. % to 12 wt. %. According to one or more embodiments, heavy pyrolysis oil comprises hepta and greater aromatics at a concentration of from 2 wt. % to 50 wt. %, from 5 wt. % to 50 wt. %, from 5 wt. % to 45 wt. %, from 10 wt. % to 40 wt. %, from 15 wt. % to 45 wt. %, from 15 wt. % to 40 wt. %, from 15 wt. % to 35 wt. %, from 15 wt. % to 30 wt. %, from 20 wt. % to 30 wt. %, or from 20 wt. % to 25 wt. %. In some embodiments, heavy pyrolysis oil comprises from 10 wt. % to 30 wt. % mono-aromatics, from 15 wt. % to 45 wt. % di-aromatics, from 2 wt. % to 10 wt. % tri-aromatics, from 2 wt. % to 10 wt. % tetra-aromatics, from 5 wt. % to 15 wt. % penta-aromatics, from 5 wt. % to 15 wt. % hexa-aromatics, and from 10 wt. % to 40 wt. % hepta and greater aromatics.

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), depolyaromatized oil (DAO) or demetallized oil (DMO) obtained from a depolyaromatization process, light and/or heavy coker gas oil obtained from a coking process, cycle oils obtained from an FCC process, and gas oil obtained from a visbreaking process.

As used herein, the term "hydrocarbon" refers to a chemical compound composed entirely of carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, the butanes, and the pentanes.

As used herein, the term "polyaromatics" refers to chemical compounds composed of three or more aromatic rings.

As used herein, the term "naphtheno/olefino-benz" refers to chemical compounds having a naphthalene-like structure with one or more branches of olefins, cyclo-paraffins, or combinations thereof.

As used herein, the term "hepta and greater aromatics" refers to polyaromatics having seven or more aromatic rings.

As used herein, the term "hydrogen/oil ratio" or "hydrogen-to-oil ratio" or "hydrogen-to-hydrocarbon ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed.

As used herein, the term "liquid hourly space velocity" or "LHSV" refers to the ratio of the liquid flow rate of the hydrocarbon feed to the catalyst volume.

As used herein, the term "conduit" includes casings, liners, pipes, tubes, coiled tubing, and mechanical structures with interior voids.

As used herein, the term "decreased content" of a substance means that a concentration of the substance is greater before passing through a stage of the process under examination than it is after passing through the stage. As used herein, the term "increased content" of a substance means that a concentration of the substance is greater after passing through a stage of the process under examination than it is before passing through the stage.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of greater than or equal to 0.1 nm and less than or equal to 2 nm, and mesopores refer to pores in a structure that have a diameter of greater than 2 nm and less than or equal to 50 nm. Unless otherwise described herein, the "pore size" of a material refers to the average pore size, but materials may additionally include micropores and/or mesopores having a particular size that is not identical to the average pore size.

According to one aspect, a multi-stage process for upgrading a mixed pyrolysis oil comprising polyaromatic compounds to benzene, toluene, ethylbenzene, and xylenes (BTEX) is provided. The process includes combining light pyrolysis oil with heavy pyrolysis oil to form the mixed pyrolysis oil. Without intending to be bound by any particular theory, it is believed that combining heavy pyrolysis oil with light pyrolysis oil provides a mixed pyrolysis oil with increased fluidity compared with heavy pyrolysis oil alone such that the mixed pyrolysis oil may have better contact with the mixed metal oxide catalyst than heavy pyrolysis oil alone. Further, components of both the light pyrolysis oil and the heavy pyrolysis oil may be productively converted BTEX in the process. As such, the light pyrolysis oil may advantageously act as a diluent for the heavy pyrolysis oil, and components of the light pyrolysis oil, in addition to the heavy pyrolysis oil, may be upgraded to BTEX in the multi-stage process. In some embodiments, the mixed pyrolysis oil comprises light pyrolysis oil at a concentration of from 5 wt. % to 50 wt. %, from 5 wt. % to 45 wt. %, from 5 wt. % to 40 wt. %, from 10 wt. % to 40 wt. %, from 10 wt. % to 35 wt. %, from 10 wt. % to 30 wt. %, or from 15 wt. % to 25 wt. %. According to one or more embodiments, the mixed pyrolysis oil comprises heavy pyrolysis oil at a concentration of from 50 wt. % to 95 wt. %, from 55 wt. % to 95 wt. %, from 60 wt. % to 95 wt. %, from 65 wt. % to 95 wt. %, from 65 wt. % to 90 wt. %, from 70 wt. % to 90 wt. %, or from 75 wt. % to 90 wt. %. In some embodiments, the mixed pyrolysis oil comprises from 5 wt. % to 40 wt. % light pyrolysis oil, and from 60 wt. % to 95 wt. % heavy pyrolysis oil.

The process may further include upgrading the mixed pyrolysis oil in a slurry-phase reactor zone to produce intermediate products and hydrocracking the intermediate products in a fixed-bed reactor zone to produce the BTEX. Although the presently described process is not limited to any particular apparatus, FIG. 1 provides a schematic of a system suitable for performing embodiments of the process described herein.

Referring to FIG. 1, upgrading system 10 includes a first reactor 12 and a second reactor 14. In embodiments, the first reactor 12 may be a slurry reactor (e.g. a fluidized bed slurry reactor) and the second reactor 14 may be a fixed-bed reactor. In embodiments, the catalyst reclamation unit may be a heated liquid-solid separator.

In operation, heavy pyrolysis oil 15 and light pyrolysis oil 16 may be combined to produce mixed pyrolysis oil feed 17. Heavy pyrolysis oil 15 may have exited as a bottom fraction from a naphtha steam cracker (not shown). Light pyrolysis oil 16 may have exited as a bottom fraction from a gas steam cracker (not shown). Mixed pyrolysis oil feed 17 may be added to the first reactor 12. First reactor 12 may include a mixed metal oxide catalyst, which is described in more detail below. The mixed pyrolysis oil may be contacted with the mixed metal oxide catalysts while hydrogen gas is added to the first reactor 12. In embodiments, the mixed metal oxide catalysts may be added simultaneously with the mixed pyrolysis oil feed 17 so that a liquid phase and a solid phase may be mixed to produce the slurry of the slurry reactor.

After being allowed to react, the entire slurry may be transferred to separator 18, which is used to separate gas products, liquid products, and used catalyst (solids), via conduit 19. The gas products may be collected via vent 20, the liquid products may be passed to the second reactor 14 via conduit 22, and the solids may be passed to catalyst reclamation unit 24 via conduit 25. In the catalyst reclamation unit 24, the catalyst is separated from residual polyaromatics and other heavy residues. The catalyst may be collected through conduit 26 and the residue may be recycled back to the mixed pyrolysis oil feed 17 via conduit 27. The collected catalyst may be restored and recycled back to the first reactor 12.

As noted above, the second reactor 14 may be a fixed-bed reactor and may contain a mesoporous zeolite-supported metal catalyst, which is described in more detail below. The liquid products from the first reactor 12 may be contacted with the mesoporous zeolite-supported metal catalysts while hydrogen gas is added to the second reactor 14. Optionally, before being contacted with the mesoporous zeolite-supported metal catalysts, the liquid products from the separator 18 may pass through a heat exchanger 28 and then into the second reactor 14 via conduit 30, as shown in FIG. 1. After being allowed to react, the resulting gaseous products may be separated from the liquid products in separator 32, and then either vented via conduit 34 or analyzed by, for example, gas chromatograph 36. The liquid products may be collected in collector 38. In embodiments, the liquid products may pass through a heat exchanger (not shown) to be cooled prior to being collected in collector 38. Various means of controlling flow rates, such as valves and pump 40, may be used throughout the system where needed.

Having described an embodiment of a system for performing a multi-stage process for upgrading mixed pyrolysis oil, embodiments of the process will be described next.

In embodiments, the mixed pyrolysis oil, hydrogen, and the mixed metal oxide catalyst are added to a slurry-phase reactor. The components may be added simultaneously in some embodiments, or at different times in other embodiments. The reactor may be agitated. In embodiments, the agitation may comprise stirring. In other embodiments, the agitation may comprise shaking. In embodiments, the reactor may be agitated via stirring and shaking.

Figure 2:
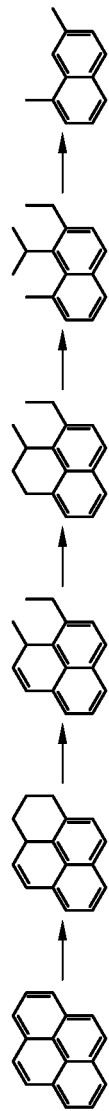
FIG. 2 is a diagram of a cascade of reactions that may occur in the slurry-phase reactor zone in accordance with embodiments described herein.

Contacting the mixed pyrolysis oil with the mixed metal oxide catalyst in the slurry-phase reactor zone causes cracking of polyaromatic compounds, described more fully below, by continuous selective hydrogenation, selective opening of saturated rings, hydro-dealkylation, trans-alkylation, and disproportionation, thereby producing di-aromatic intermediates. An example of a cascade of such reactions is shown in FIG. 2, beginning with pyrene and resulting in a methylated naphthalene. The formation of methylated naphthalene from pyrene is, of course, merely an example of the cascade of reactions, and other starting materials and products are contemplated.

In embodiments, the mixed pyrolysis oil may include one or more polyaromatic compounds. The polyaromatic compounds may include 16 or more aromatic carbon atoms ($C_{16}$+), such as $C_{16}$-$C_{110}$ polyaromatic compounds. For instance, the polyaromatic compounds may be $C_{16}$-$C_{100}$, $C_{16}$-$C_{90}$, $C_{16}$-$C_{80}$, $C_{16}$-$C_{70}$, $C_{16}$-$C_{60}$, $C_{16}$-$C_{50}$, $C_{16}$-$C_{40}$, $C_{16}$-$C_{30}$, $C_{16}$-$C_{20}$, $C_{20}$-$C_{110}$, $C_{30}$-$C_{110}$, $C_{40}$-$C_{110}$, $C_{50}$-$C_{110}$, $C_{60}$-$C_{110}$, $C_{70}$-$C_{110}$, $C_{80}$-$C_{110}$, $C_{90}$-$C_{110}$, or even $C_{100}$-$C_{110}$ polyaromatic compounds. In embodiments, the polyaromatic compounds may include multiple fused aromatic rings, such as 3, 4, 5, 6, 7, 8, 9, or 10 fused benzene rings.

According to one or more embodiments, the mixed pyrolysis oil comprises dicyclopentadiene (DCPD). In some embodiments, the mixed pyrolysis oil comprises DCPD at a concentration of from 0.1 wt. % to 50 wt. %, 0.1 wt. % to 20 wt. %, from 0.2 wt. % to 10 wt. %, from 0.2 wt. % to 5 wt. %, from 0.5 wt. % to 5 wt. %, from 0.5 wt. % to 4 wt. %, or from 1 wt. % to 3 wt. %. In some embodiments, DCPD consumption may be monitored to evaluate catalyst activity.

Conditions of the reactor, such as flow rate into the reactor, temperature in the reactor, and pressure in the reactor may be varied to control the reaction in the first reactor. In embodiments, the flow rate of the hydrogen gas may be from 15 m/min to 35 ml/min, such as from 20 ml/min to 35 m/min, from 25 ml/min to 35 ml/min, from 30 ml/min to 35 ml/min, from 15 ml/min to 30 ml/min, from 15 ml/min to 25 ml/min, or even from 15 m/min to 20 m/min. It is envisioned that the flow rate of the hydrogen may be from any of the lower limits disclosed herein to any of the upper limits disclosed herein. Without intending to be bound by any particular theory, it is believed that a hydrogen flow rate into the reactor less than 15 m/min may not allow sufficient levels of hydrogen into the reactor. However, a hydrogen flow rate greater than 35 ml/min may cause too much hydrogen to circulate within the system, such that an unacceptable amount of the hydrogen is consumed.

In embodiments, the pyrolysis oil, diluent, hydrogen, and mixed metal oxide catalyst are allowed to reside in the slurry-phase reactor for a period of time from 1.5 h to 7.5 h. For example, the components may be allowed to reside in the slurry-phase reactor for from 1.5 h to 7 h, from 1.5 h to 6.5 h, from 1.5 h to 6 h, from 1.5 h to 5.5 h, from 1.5 h to 5 h, from 1.5 h to 4.5 h, from 1.5 h to 4 h, from 1.5 h to 3.5 h, from 1.5 h to 3 h, from 1.5 h to 2.5 h, from 1.5 h to 2 h, from 2 h to 7.5 h, from 2.5 h to 7.5 h, from 3 h to 7.5 h, from 3.5 h to 7.5 h, from 4 h to 7.5 h, from 4.5 h to 7.5 h, from 5 h to 7.5 h, from 5.5 h to 7.5 h, from 6 h to 7.5 h, from 6.5 h to 7.5 h, or even from 7 h to 7.5 h. It is envisioned that the flow rate of the pyrolysis oil and diluent may be from any of the lower limits disclosed herein to any of the upper limits disclosed herein. Without intending to be bound by any particular theory, it is believed that if the components are allowed to reside in the slurry-phase reactor for less than 1.5 h, one or more of the continuous selective hydrogenation, selective opening of saturated rings, hydro-dealkylation, trans-alkylation, and disproportionation may not have sufficient time to proceed to completion. However, unwanted byproducts may be produced if this time is extended beyond 7.5 h.

In embodiments, the first reactor in the slurry-phase reactor zone may be operated at a temperature from 350° C. to 450° C., such as from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., from 440° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., or even from 350° C. to 360° C. It is envisioned that the temperature may be from any of the lower limits disclosed herein to any of the upper limits disclosed herein. Without intending to be bound by any particular theory, it is believed that having a reactor temperature below 350° C. may cause one or more of the continuous selective hydrogenation, selective opening of saturated rings, hydro-dealkylation, trans-alkylation, and disproportionation to proceed too slowly to be commercially viable, but having a reactor temperature above 450° C. may cause one or more of these reactions to proceed too quickly, which may lead to a runaway reaction or premature deactivation of the catalyst.

In embodiments, the first reactor of the slurry-phase reactor zone may be operated at a pressure from 3 MPa to 18 MPa, from 3.5 MPa to 18 MPa, from 4 MPa to 18 MPa, from 4.5 MPa to 18 MPa, from 5 MPa to 18 MPa, from 5.5 MPa to 18 MPa, from 6 MPa to 18 MPa, from 6.5 MPa to 18 MPa, from 7 MPa to 18 MPa, from 7.5 MPa to 18 MPa, from 8 MPa to 18 MPa, from 8.5 MPa to 18 MPa, from 9 MPa to 18 MPa, from 9.5 MPa to 18 MPa, from 10 MPa to 18 MPa, from 10.5 MPa to 18 MPa, from 11 MPa to 18 MPa, from 11.5 MPa to 18 MPa, from 12 MPa to 18 MPa, from 12.5 MPa to 18 MPa, from 13 MPa to 18 MPa, from 13.5 MPa to 18 MPa, from 14 MPa to 18 MPa, from 14.5 MPa to 18 MPa, from 15 MPa to 18 MPa, from 15.5 MPa to 18 MPa, from 16 MPa to 18 MPa, from 3 MPa to 17.5 MPa, from 3 MPa to 17 MPa, from 3 MPa to 16.5 MPa, from 3 MPa to 16 MPa, from 3 MPa to 15.5 MPa, from 3 MPa to 15 MPa, from 3 MPa to 14.5 MPa, from 3 MPa to 14 MPa, from 3 MPa to 13.5 MPa, from 3 MPa to 13 MPa, from 3 MPa to 12.5 MPa, from 3 MPa to 12 MPa, from 3 MPa to 11.5 MPa, from 3 MPa to 11 MPa, from 3 MPa to 10.5 MPa, from 3 MPa to 10 MPa, from 3 MPa to 9.5 MPa, from 3 MPa to 9 MPa, from 3 MPa to 8.5 MPa, from 3 MPa to 8 MPa, from 3 MPa to 7.5 MPa, from 3 MPa to 7 MPa, from 3 MPa to 6.5 MPa, from 3 MPa to 6 MPa, from 3 MPa to 5.5 MPa, or even from 3 MPa to 5 MPa. It is envisioned that the pressure may be from any of the lower limits disclosed herein to any of the upper limits disclosed herein. Without intending to bound by any particular theory, it is believed that a pressure below 3 MPa may be insufficient for one or more of the continuous selective hydrogenation, selective opening of saturated rings, hydro-dealkylation, trans-alkylation, and disproportionation to take place. However, at a pressure above 18 MPa, specialized high-pressure equipment may become necessary, which would increase the cost of performing the reaction.

The slurry-phase reactor includes a mixed metal oxide catalyst. In embodiments, the mixed metal oxide catalyst comprises two or more of $Fe_2O_3$, $ZrO_2$, $CeO_2$, $Al_2O_3$, $TiO_2$, $MoO_3$, $Co_2O_3$, and NiO. In embodiments, the mixed metal oxide catalyst may include $Fe_2O_3$ at from 50 wt. % to 98 wt. %, from 55 wt. % to 95 wt. %, from 60 wt. % to 95 wt. %, from 65 wt. % to 95 wt. %, from 65 wt. % to 90 wt. %, from 70 wt. % to 90 wt. %, from 75 wt. % to 90 wt. %, or from 80 wt. % to 85 wt. %. In some embodiments, the mixed metal oxide catalyst may include $ZrO_2$ at from 1 wt. % to 60 wt. %, from 2 wt. % to 60 wt. %, from 2 wt. % to 50 wt. %, from 2 wt. % to 40 wt. %, from 2 wt. % to 30 wt. %, from 2 wt. % to 20 wt. %, from 2 wt. % to 15 wt. %, from 3 wt. % to 15 wt. %, from 3 wt. % to 10 wt. %, from 5 wt. % to 10 wt. %, or from 7 wt. % to 8 wt. %. According to one or more embodiments, the mixed metal oxide catalyst may include $CeO_2$ at from 0.5 wt. % to 10 wt. %, from 0.5 wt. % to 7 wt. %, from 0.5 wt. % to 5 wt. %, from 1 wt. % to 5 wt. %, from 1 wt. % to 4 wt. %, from 2 wt. % to 4 wt. %, or from 2 wt. % to 3 wt. %. In some embodiments, the mixed metal oxide catalyst may include; and $Al_2O_3$ at from 1 wt. % to 50 wt. %, from 1 wt. % to 40 wt. %, from 1 wt. % to 30 wt. %, from 1 wt. % to 20 wt. %, from 2 wt. % to 20 wt. %, from 2 wt. % to 15 wt. %, from 3 wt. % to 15 wt. %, from 3 wt. % to 12 wt. %, from 5 wt. % to 10 wt. %, or from 6 wt. % to 8 wt. %, where wt. % is calculated based on the total amount of oxides.

After the pyrolysis oil is contacted with the mixed metal oxide catalyst, a gaseous phase, a liquid phase, and a solid phase are produced, and may be separated from one another. The gaseous phase may be vented or collected. Conveniently, the gaseous phase may be analyzed prior to collection or venting so the material balance before and after the reaction may be calculated. The solid phase includes the used mixed metal oxide catalyst, which may be recycled to the slurry-phase reactor. The liquid phase includes the intermediate products, which are sent to the fixed-bed reactor zone for further processing. In embodiments, the intermediate products may include di-aromatic compounds and mono-aromatic compounds. Examples of di-aromatic compounds include, but are not limited to, naphthalene and tetralin, both of which may be unsubstituted or substituted with straight-chain or branched hydrocarbon substituents. Examples of mono-aromatic compounds include, but are not limited to, benzene, which may be unsubstituted or substituted with straight-chain or branched hydrocarbon substituents In embodiments, from 90% to 100% of the pyrolysis oil may be converted to the intermediate products. For instance from 90% to 99%, from 90% to 98%, from 90% to 97%, from 90% to 96%, from 90% to 95%, from 90% to 94%, from 90% to 93%, from 90% to 92%, from 90% to 91%, from 91% to 100%, from 92% to 100%, from 93% to 100%, from 94% to 100%, from 95% to 100%, from 96% to 100%, from 97% to 100%, from 98% to 100%, or even from 99% to 100% of the pyrolysis oil may be converted to the intermediate products. It is envisioned that the yield of intermediate products may be from any of the lower limits disclosed herein to any of the upper limits disclosed herein.

The liquid phase may be sent to the second reactor in the fixed-bed reactor zone. In embodiments, an optional heat exchanger may be positioned between the slurry reactor zone and the fixed-bed reactor zone so that the temperature of the liquid phase may be controlled before being introduced into the fixed-bed reactor. The optional heat exchanger may help to control the temperature of the liquid intermediate products at a temperature sufficient to avoid condensation of the intermediate products between the slurry reactor and the fixed-bed reactor.

Figure 3:
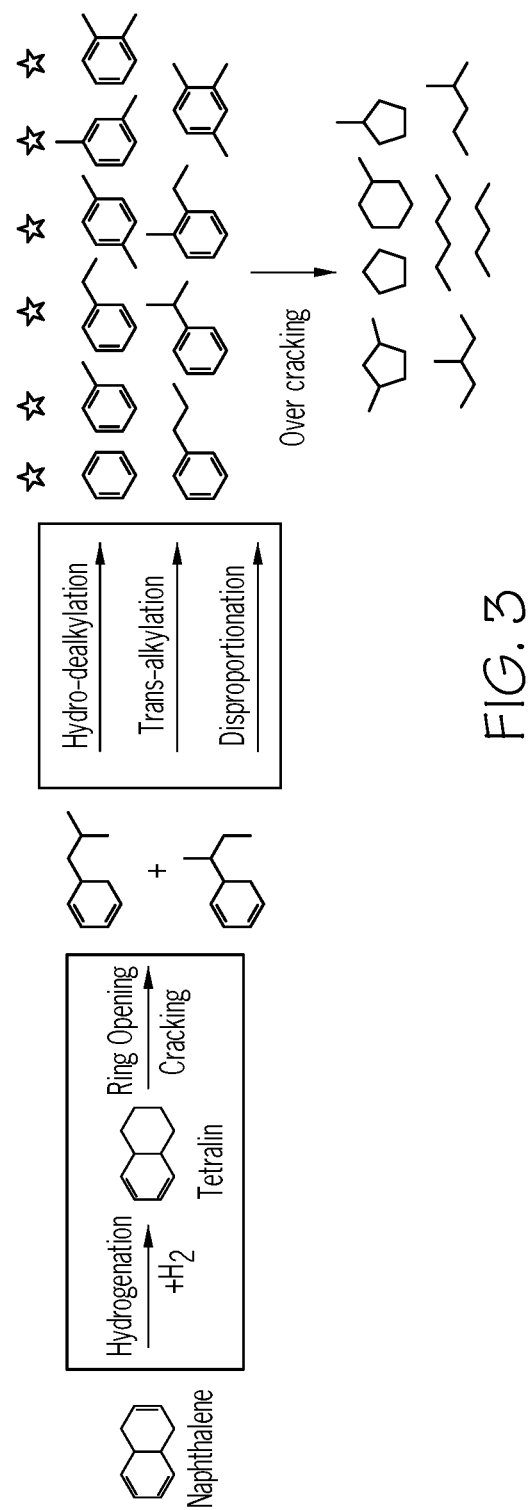
FIG. 3 is a diagram of a cascade of reactions that may occur in the fixed-bed reactor zone in accordance with embodiments described herein.

Contacting the intermediates from the slurry-phase reactor zone with the mesoporous zeolite-supported metal catalysts in the fixed bed reactor, described more fully below, produces BTEX by selective hydrogenation, selective opening of the saturated ring, and then further hydro-dealkylation, trans-alkylation, and disproportionation. This cascade of reactions is shown in FIG. 3, beginning with naphthalene and resulting in BTEX. In the event of over-cracking, saturated hydrocarbons may also be produced. The formation of BTEX from naphthalene is, of course, merely an example of the cascade of reactions, and other starting materials are contemplated.

Conditions of the reactor, such as flow rate into the fixed bed reactor, temperature in the reactor, and pressure in the reactor may be varied to control the reaction in the second reactor. In embodiments, the flow rate of the hydrogen gas may be from 15 ml/min to 35 ml/min, such as from 20 ml/min to 35 ml/min, from 25 ml/min to 35 ml/min, from 30 ml/min to 35 ml/min, from 15 ml/min to 30 ml/min, from 15 ml/min to 25 ml/min, or even from 15 ml/min to 20 ml/min. It is envisioned that the hydrogen flow rate may be from any of the lower limits disclosed herein to any of the upper limits disclosed herein. Without intending to be bound by any particular theory, it is believed that a hydrogen flow rate into the reactor less than 15 ml/min may not allow sufficient levels of hydrogen into the reactor. However, a hydrogen flow rate greater than 35 ml/min may cause too much hydrogen to circulate within the system, such that an unacceptable amount of the hydrogen is consumed.

In embodiments, the flow rate of the liquid product stream from the slurry-phase reactor zone may be from 0.2 g/min to 1 g/min, such as from 0.3 g/min to 1 g/min, from 0.4 g/min to 1 g/min, from 0.5 g/min to 1 g/min, from 0.6 g/min to 1 g/min, from 0.7 g/min to 1 g/min, from 0.8 g/min to 1 g/min, from 0.9 g/min to 1 g/min, from 0.2 g/min to 0.9 g/min, from 0.2 g/min to 0.8 g/min, from 0.2 g/min to 0.7 g/min, from 0.2 g/min to 0.6 g/min, from 0.2 g/min to 0.5 g/min, from 0.2 g/min to 0.4 g/min, or even from 0.2 g/min to 0.3 g/min. It is envisioned that the flow rate of the liquid product stream from the slurry-phase reactor zone may be from any of the lower limits disclosed herein to any of the upper limits disclosed herein. Any convenient apparatus for controlling the flow rate, such as a liquid pump, may be used. Without intending to be bound by any particular theory, it is believed that a flow rate of the liquid product stream from the slurry-phase reactor zone less than 0.2 g/min may not allow sufficient levels of the liquid product stream into the reactor. However, a flow rate greater than 1 g/min may cause too much of the liquid product stream to circulate within the system, such that an unacceptable amount of the liquid product stream remains unreacted upon exiting the reactor.

In embodiments, the second reactor in the fixed-bed reactor zone may be operated at a temperature from 350° C. to 450° C., such as from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., from 440° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., or even from 350° C. to 360° C. It is envisioned that the temperature may be from any of the lower limits disclosed herein to any of the upper limits disclosed herein. The temperature within the fixed-bed reactor may be, but need not be, the same as the temperature within the slurry-phase reactor. Without intending to be bound by any particular theory, it is believed that having a reactor temperature below 350° C. may cause one or more of the selective hydrogenation, selective opening of the saturated ring, and then further hydro-dealkylation, trans-alkylation, and disproportionation to proceed too slowly to be commercially viable, but having a reactor temperature above 450° C. may cause one or more of these reactions to proceed too quickly, which may lead to a runaway reaction or premature deactivation of the catalyst.

In embodiments, the second reactor in the fixed-bed reactor zone may be operated at a pressure from 3 MPa to 18 MPa, from 3.5 MPa to 18 MPa, from 4 MPa to 18 MPa, from 4.5 MPa to 18 MPa, from 5 MPa to 18 MPa, from 5.5 MPa to 18 MPa, from 6 MPa to 18 MPa, from 6.5 MPa to 18 MPa, from 7 MPa to 18 MPa, from 7.5 MPa to 18 MPa, from 8 MPa to 18 MPa, from 8.5 MPa to 18 MPa, from 9 MPa to 18 MPa, from 9.5 MPa to 18 MPa, from 10 MPa to 18 MPa, from 10.5 MPa to 18 MPa, from 11 MPa to 18 MPa, from 11.5 MPa to 18 MPa, from 12 MPa to 18 MPa, from 12.5 MPa to 18 MPa, from 13 MPa to 18 MPa, from 13.5 MPa to 18 MPa, from 14 MPa to 18 MPa, from 14.5 MPa to 18 MPa, from 15 MPa to 18 MPa, from 15.5 MPa to 18 MPa, from 16 MPa to 18 MPa, from 3 MPa to 17.5 MPa, from 3 MPa to 17 MPa, from 3 MPa to 16.5 MPa, from 3 MPa to 16 MPa, from 3 MPa to 15.5 MPa, from 3 MPa to 15 MPa, from 3 MPa to 14.5 MPa, from 3 MPa to 14 MPa, from 3 MPa to 13.5 MPa, from 3 MPa to 13 MPa, from 3 MPa to 12.5 MPa, from 3 MPa to 12 MPa, from 3 MPa to 11.5 MPa, from 3 MPa to 11 MPa, from 3 MPa to 10.5 MPa, from 3 MPa to 10 MPa, from 3 MPa to 9.5 MPa, from 3 MPa to 9 MPa, from 3 MPa to 8.5 MPa, from 3 MPa to 8 MPa, from 3 MPa to 7.5 MPa, from 3 MPa to 7 MPa, from 3 MPa to 6.5 MPa, from 3 MPa to 6 MPa, from 3 MPa to 5.5 MPa, or even from 3 MPa to 5 MPa. It is envisioned that the pressure may be from any of the lower limits disclosed herein to any of the upper limits disclosed herein. The pressure within the fixed-bed reactor may be, but need not be, the same as the pressure within the slurry-phase reactor. Without intending to bound by any particular theory, it is believed that a pressure below 3 MPa may be insufficient for one or more of the selective hydrogenation, selective opening of the saturated ring, and then further hydro-dealkylation, trans-alkylation, and disproportionation to take place. However, at a pressure above 18 MPa, specialized high-pressure equipment may become necessary, which would increase the cost of performing the reaction.

The fixed-bed reactor includes a mesoporous zeolite-supported metal catalyst. In embodiments, the metal of the mesoporous zeolite-supported metal catalyst comprises molybdenum, tungsten, or a combination thereof. According to one or more embodiments, the metal of the mesoporous zeolite-supported metal catalyst comprises molybdenum, tungsten, or a combination thereof, and further comprises nickel, cobalt, or a combination thereof. In some embodiments, the mesoporous zeolite-supported metal catalyst comprises molybdenum at from 2 wt. % to 20 wt. %, from 3 wt. % to 20 wt. %, from 3 wt. % to 18 wt. %, from 3 wt. % to 15 wt. %, from 5 wt. % to 15 wt. %, from 7 wt. % to 13 wt. %, from 8 wt. % to 12 wt. %, or from 9 wt. % to 11 wt. %. According to one or more embodiments, the mesoporous zeolite-supported metal catalyst comprises nickel, cobalt, or a combination thereof at from 0.1 wt. % to 10 wt. %, from 0.1 wt. % to 5 wt. %, from 0.2 wt. % to 5 wt. %, from 0.5 wt. % to 5 wt. %, from 0.5 wt. % to 3 wt. %, from 1 wt. % to 3 wt. %, or from 1.5 wt. % to 2.5 wt. %. In some embodiments, the mesoporous zeolite-supported metal catalyst comprises from 2 wt. % to 20 wt. % molybdenum and from 0.1 wt. % to 5 wt. % of nickel, cobalt, or a combination thereof. According to one or more embodiments, the mesoporous zeolite-supported metal catalyst comprises nickel at from 0.1 wt. % to 10 wt. %, from 0.1 wt. % to 5 wt. %, from 0.2 wt. % to 5 wt. %, from 0.5 wt. % to 5 wt. %, from 0.5 wt. % to 3 wt. %, from 1 wt. % to 3 wt. %, or from 1.5 wt. % to 2.5 wt. %. In some embodiments, the mesoporous zeolite-supported metal catalyst comprises from 5 wt. % to 15 wt. % molybdenum and from 0.5 wt. % to 3 wt. % nickel.

The mesoporous zeolite-supported metal catalyst includes a zeolite support. Generally, zeolites may be characterized by a framework type which defines their microporous structure. The zeolites described presently, in one or more embodiments, are not particularly limited by framework type. Framework types are described in, for example, "Atlas of Zeolite Framework Types" by Ch. Baerlocher et al, Fifth Revised Edition, 2001, which is incorporated by reference herein. In embodiments, the zeolites may comprise microstructures (which include micropores) characterized as, among others, *BEA framework type zeolites (such as, but not limited to, zeolite Beta), FAU framework type zeolites (such as, but not limited to, zeolite Y), MOR framework type zeolites, or MFI framework type zeolite (such as, but not limited to, ZSM-5). It should be understood that *BEA, MFI, MOR, and FAU refer to zeolite framework types as identified by their respective three letter codes established by the International Zeolite Association (IZA). Other framework types are contemplated in the presently disclosed embodiments. In embodiments, the zeolite support of the mesoporous zeolite-supported metal catalyst comprises a zeolite selected from the group consisting of zeolite Beta, ZSM-5, Mordenite, Zeolite Y, and combinations thereof. In some embodiments, the zeolite support comprises a zeolite selected from the group consisting of zeolite Beta, Zeolite Y, and combinations thereof. According to one or more embodiments, the zeolite support comprises zeolite Beta.

In some embodiments, the zeolite support of the mesoporous zeolite-supported metal catalyst has a silica to alumina mole ratio ($SiO_2/Al_2O_3$) of from 10 to 50. According to one or more embodiments, the zeolite support has a silica to alumina mole ratio of from 5 to 50, from 10 to 50, from 15 to 50, from 20 to 50, from 20 to 45, from 25 to 45, from 30 to 45, from 30 to 40, or from 35 to 40.

After the intermediate products of the liquid phase are contacted with the mesoporous zeolite-supported metal catalyst in the fixed-bed reactor zone, a gaseous phase and a liquid phase are produced. The gaseous phase and liquid phase may be separated from one another using a liquid/gas separator. The gaseous phase may be vented or collected. Conveniently, the gaseous phase may be analyzed prior to collection or venting so the material balance before and after the reaction may be calculated. The liquid phase, which includes the BTEX, may be cooled using, for example, a heat exchanger and then collected.

In embodiments, from 25% to 45% by weight of the mixed pyrolysis oil may be converted to BTEX ("the overall yield"). For instance, the overall yield may be from 10% to 50%, from 15% to 50%, from 20% to 50%, from 20% to 45%, from 25% to 45%, from 30% to 45%, from 35% to 45%, or from 38% to 42%. It is envisioned that the overall yield may be from any of the lower limits disclosed herein to any of the upper limits disclosed herein.

In some embodiments, the multi-stage process consumes from 80% to 100% of the DCPD in the mixed pyrolysis oil. According to one or more embodiments, the multi-stage process consumes from 40% to 100%, from 50% to 100%, from 60% to 100%, from 65% to 100%, from 70% to 100%, from 80% to 100%, from 85% to 100%, from 90% to 100%, from 95% to 100%, or from 98% to 100% of the DCPD in the mixed pyrolysis oil.

The embodiments described herein may help to limit aromatic content in fuels, thereby helping to protect the environment. Further, the embodiments enable production of aromatic compounds, which are valued in industry as intermediates, under relatively mild conditions. For instance, pyrolysis oil can now be used as a feedstock to produce para-xylene, which is a well-known intermediate for the production of PTA.

EXAMPLES

Using embodiments described above, an exemplary scheme for producing BTEX was performed.

Synthesis of Mixed Metal Oxide Catalyst

An exemplary mixed metal oxide catalyst was formulated to have a composition of 83 wt. % $Fe_2O_3$, 7.5 wt. % $ZrO_2$, 2.5 wt. % $CeO_2$, and 7 wt. % $Al_2O_3$, with the concentration calculated on an oxide basis. $Fe(NO_3)_3 \cdot 9H_2O$ (40 g) was dissolved in 800 ml distilled water to form solution A. $Al(NO_3)_3 \cdot 9H_2O$ (4.906 g), $ZrO(NO_3)_2$ (1.549 g), and $Ce(NO_3)_3 \cdot 6H_2O$ (0.601 g) were added to solution A to produce solution B, which was stirred for 30 min. An ammonium hydroxide solution (40 ml, 28%-30% $NH_3$ basis) was mixed with 60 ml distilled water to produce solution C. Solution B was titrated to a pH of 7 by gradual addition of solution C. The properly titrated solution was mixed for one hour, thereby forming a precipitate. The precipitate was isolated and dried at overnight in an oven. The dried solid was then calcined in air at 500° C. for two hours. The calcined product was crushed to obtain the final mixed metal oxide catalyst as a powder.

Synthesis of Mesoporous Zeolite-Supported Metal Catalysts

Six different mesoporous zeolite-supported metal (MZM) catalysts were prepared according to the following general procedure. Appropriate quantities of metal precursor(s) and zeolite were added to 100 mL of water in a 250 mL round bottom flask equipped with a magnetic stir bar. The mixture was stirred at 500 rpm for 1 h at which point the mixture was homogenous. Water was removed under vacuum at 50° C. via a rotary evaporator. The solid was dried overnight at 100° C. The dried solid was calcined at 550° C. for 5 h to obtain the catalyst.

Each of the prepared catalysts are detailed in Table 1. The zeolites used in the study were purchased from Zeolyst International. In particular, Zeolite Beta ($SiO_2/Al_2O_3$ ratio: 38) corresponds to Zeolyst product CP814C. Zeolite Beta ($SiO_2/Al_2O_3$ ratio: 25) corresponds to Zeolyst product CP814E. Zeolite Y ($SiO_2/Al_2O_3$ ratio: 30) corresponds to Zeolyst product CBV720. Zeolite Y ($SiO_2/Al_2O_3$ ratio: 12) corresponds to Zeolyst product CBV712.

The metal precursors used to prepare the MZM catalysts were purchased from Aldrich. The Mo precursor was $(NH4)_6Mo_7O_{24} \cdot 4H_2O$, the Ni precursor was $Ni(NO_3)_2 \cdot 6H_2O$, and the Co precursor was $Co(NO_3)_2 \cdot 6H_2O$.

TABLE 1

Composition of Prepared MZM Catalysts

| Catalyst | Zeolite | $SiO_2/Al_2O_3$ | Metal |
|---|---|---|---|
| MZM 1 | Y | 30 | Mo (10 wt. %) |
| MZM 2 | Y | 12 | Mo (10 wt. %) |
| MZM 3 | Y | 30 | Mo (20 wt. %) |
| MZM 4 | Beta | 38 | Mo (10 wt. %) and Ni (2 wt. %) |
| MZM 5 | Beta | 38 | Mo (10 wt. %) and Co (2 wt. %) |
| MZM 6 | Beta | 25 | Mo (10 wt. %) and Ni (2 wt. %) |

Each catalyst was pretreated prior to use in the process. To pretreat, the catalyst was added to the fixed-bed reactor, which was then heated to 400° C. at a heating rate of 5° C./min under a hydrogen flow of 25 ml/min and atmospheric pressure. Once the reactor temperature reached 400° C., the reactor was pressurized with hydrogen gas to 3 MPa, and the hydrogen flow was then maintained at a rate of 25 ml/min.

Obtaining BTEX from Mixed Pyrolysis Oil

Heavy pyrolysis oil (16 g) was mixed with light pyrolysis oil (4 g) to form the mixed pyrolysis oil feed. The composition of the heavy pyrolysis oil is detailed in Table 2, and the composition of the light pyrolysis oil is detailed in Table 3.

TABLE 2

Composition of the Heavy Pyrolysis Oil

| Component | Wt. % |
|---|---|
| Saturates | 2 |
| Mono-aromatics | 18 |
| Di-aromatics | 28 |
| Tri-aromatics | 5 |
| Tetra-aromatics | 5 |
| Penta-aromatics | 9 |

TABLE 2-continued

Composition of the Heavy Pyrolysis Oil

| Component | Wt. % |
|---|---|
| Hexa-aromatics | 10 |
| Hepta and greater aromatics | 23 |

TABLE 3

Composition of the Light Pyrolysis Oil

| Component | Wt. % |
|---|---|
| Paraffins | 8.32 |
| BTEX | 4.07 |
| Mono-aromatics | 59.32 |
| Naphthalenes | 3.01 |
| Naphtheno/Olefino-Benz | 0.84 |
| Indenes | 10.83 |
| Mono-Naphthenes | 3.71 |
| Dicyclopentadiene (DCPD) | 9.25 |
| Olefins | 0.50 |

The mixed pyrolysis oil feed and mixed metal oxide catalyst (5 g), prepared as above, were added to a slurry reactor. The slurry reactor was purged three times with hydrogen gas before being pressurized with hydrogen gas to 14 MPa. The mixture was then heated to 400° C. and stirred continuously for 4 hours. The reaction mixture was cooled to room temperature and the gas mixture was released and collected into a gas bag. The slurry was transferred to a centrifuge tube and centrifuged at 10,000 rpm for 20 minutes, after which two layers were present. The top layer was the stage 1 liquid product and the bottom was the solid used mixed metal oxide catalyst. The used mixed metal oxide catalyst was washed with toluene to remove possible condensate, and vacuum dried from 20° C. to 100° C.

The stage 1 liquid product was analyzed by simulated distillation (SIMDIS) gas chromatography, vacuum ultra-violet absorption gas chromatography (GC-VUV), and high-performance liquid chromatography (HPLC). Based on the analysis, the stage 1 liquid product comprised 14.46 wt. % di-aromatics, 73.13 wt. % mono-aromatics, 8.75 wt. % dicyclopentadiene (DCPD), and 3.66 wt. % BTEX.

The stage 1 liquid product was fed to the fixed-bed reactor containing 0.5 g of pretreated catalyst at a feed rate of 0.6 g/hour. The fixed bed reactor stage was repeated for each MZM catalyst. The fixed bed reactor stage was also performed with a silicon carbide (SiC) catalyst for comparison as a blank. In each experiment, the reactor temperature was maintained at 400° C. and 3 MPa. The hydrogen flow was maintained at a rate of 25 ml/min, and the reaction was allowed to proceed for 24 hours. After each reaction, the product mixture was separated into gaseous and liquid components and analyzed. The product mixture for each example is summarized in Table 4.

TABLE 4

Composition of Product Mixture for Each Example

| Example | Catalyst | light gas (wt. %) | BTEX (wt. %) | DCPD (wt. %) | mono-aromatics (wt. %) | di-aromatics (wt. %) |
|---|---|---|---|---|---|---|
| 1 | MZM 1 | 34.89 | 13.06 | 4.94 | 36.76 | 10.35 |
| 2 | MZM 2 | 18.37 | 14.15 | 6.08 | 40.71 | 20.70 |
| 3 | MZM 3 | 23.46 | 13.04 | 6.23 | 44.08 | 13.19 |

TABLE 4-continued

Composition of Product Mixture for Each Example

| Example | Catalyst | light gas (wt. %) | BTEX (wt. %) | DCPD (wt. %) | mono-aromatics (wt. %) | di-aromatics (wt. %) |
|---|---|---|---|---|---|---|
| 4 | MZM 4 | 19.41 | 44.27 | 0.23 | 2.80 | 33.30 |
| 5 | MZM 5 | 23.06 | 37.38 | 0.41 | 3.99 | 35.16 |
| 6 | MZM 6 | 24.09 | 12.02 | 5.54 | 35.08 | 23.27 |
| Comparative 1 | SiC | 6.20 | 7.63 | 8.24 | 61.05 | 16.87 |

Based on the product mixtures, the overall BTEX yield and DCPD consumption was calculated. The use of silicon carbide as the catalyst did not change the composition of the stage 1 liquid product substantially (see Comparative Example 1). Each of the MZM catalysts upgraded the amount of BTEX and reduced the amount of DCPD from the stage 1 liquid product. The overall BTEX yield from the mixed pyrolysis oil as well as the DCPD consumption is shown in Table 5.

TABLE 5

Overall BTEX yield and DCPD Consumption for Each Example

| Example | Catalyst | BTEX yield (%) | DCPD Consumption (%) |
|---|---|---|---|
| 1 | MZM 1 | 9.36 | 44.18 |
| 2 | MZM 2 | 10.42 | 31.79 |
| 3 | MZM 3 | 9.33 | 29.84 |
| 4 | MZM 4 | 40.44 | 97.46 |
| 5 | MZM 5 | 33.62 | 95.46 |
| 6 | MZM 6 | 8.15 | 40.10 |
| Comparative 1 | SiC | 3.93 | 6.77 |

The use of silicon carbide as the catalyst provided a negligible BTEX yield (3.93%) and consumed only 6.77% of the DCPD. All of the MZM catalysts consumed at least 30% of the DCPD and provided a BTEX yield of at least 8%. None of Examples 1-3, which all featured catalysts with only Mo as the metal and with a Zeolite Y support, provided a BTEX yield above 10.5%. By far the best results were obtained with MZM 4 (40.44% BTEX yield and 97.46% DCPD consumption) and MZM 5 33.62% BTEX yield and 95.46% DCPD consumption). MZM 4, which contains Mo and Ni, performed slightly better than MZM 5, which contains Mo and Co. Both MZM 4 and MZM 5 contain zeolite Beta with a silica to alumina ratio of 38 (see Table 1). Notably, as evidenced by comparing Example 4 with Example 6, a change in the silica to alumina ratio from 38 to 25 results in substantially diminished catalyst performance.

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A multi-stage process for upgrading a mixed pyrolysis oil comprising polyaromatic compounds to benzene, toluene, ethylbenzene, and xylenes (BTEX), the method comprising:
   combining light pyrolysis oil, wherein the light pyrolysis oil comprises paraffins, BTEX, mono-aromatics, naphthalenes, indenes, mono-naphthenes, and dicyclopentadiene, with heavy pyrolysis oil to form the mixed pyrolysis oil;
   upgrading the mixed pyrolysis oil in a slurry-phase reactor zone to produce intermediate products, wherein the slurry-phase reactor zone comprises a mixed metal oxide catalyst; and
   hydrocracking the intermediate products in a fixed-bed reactor zone to produce the BTEX, wherein the fixed-bed reactor zone comprises a mesoporous zeolite-supported metal catalyst.

2. The multi-stage process of claim 1, wherein the mixed metal oxide catalyst comprises two or more of $Fe_2O_3$, $ZrO_2$, $CeO_2$, $Al_2O_3$, $TiO_2$, $MoO_3$, $Co_2O_3$, and NiO.

3. The multi-stage process of claim 1, wherein the mixed metal oxide catalyst comprises:
   from 70 wt. % to 90 wt. % $Fe_2O_3$;
   from 5 wt. % to 60 wt. % $ZrO_2$;
   from 1 wt. % to 4 wt. % $CeO_2$; and
   from 5 wt. % to 10 wt. % $Al_2O_3$,
   where wt. % is calculated based on the total amount of oxides.

4. The multi-stage process of claim 1, wherein the metal of the mesoporous zeolite-supported metal catalyst comprises molybdenum.

5. The multi-stage process of claim 4, wherein the metal of the mesoporous zeolite-supported metal catalyst further comprises nickel, cobalt, or a combination thereof.

6. The multi-stage process of claim 4, wherein the mesoporous zeolite-supported metal catalyst comprises from 2 wt. % to 20 wt. % molybdenum, and from 0.1 wt. % to 5 wt. % of nickel, cobalt, or a combination thereof.

7. The multi-stage process of claim 6, wherein the mesoporous zeolite-supported metal catalyst comprises:
from 5 wt. % to 15 wt. % molybdenum; and
from 0.5 wt. % to 3 wt. % nickel.

8. The multi-stage process of claim 4, wherein the zeolite support comprises a zeolite selected from the group consisting of zeolite Beta, ZSM-5, Mordenite, Zeolite Y, and combinations thereof.

9. The multi-stage process of claim 8, wherein the zeolite support comprises a zeolite selected from the group consisting of zeolite Beta, Zeolite Y, and combinations thereof.

10. The multi-stage process of claim 9, wherein the zeolite support has a silica to alumina ratio of from 10 to 50.

11. The multi-stage process of claim 9, wherein the zeolite support comprises zeolite Beta.

12. The multi-stage process of claim 11, wherein the zeolite support has a silica to alumina ratio of from 20 to 45.

13. The multi-stage process of claim 1, wherein 25% to 45% of the mixed pyrolysis oil is converted to BTEX.

14. The multi-stage process of claim 1, wherein the mixed pyrolysis oil comprises:
from 5 wt. % to 40 wt. % light pyrolysis oil; and
from 60 wt. % to 95 wt. % heavy pyrolysis oil.

15. The multi-stage process of claim 1, wherein the mixed pyrolysis oil comprises dicyclopentadiene.

16. The multi-stage process of claim 15, wherein the multi-stage process consumes from 80% to 100% of the dicyclopentadiene in the mixed pyrolysis oil.

17. The multi-stage process of claim 1, wherein the light pyrolysis oil comprises from from 1 wt. % to 20 wt. % BTEX.

18. The multi-stage process of claim 1, wherein the light pyrolysis oil comprises from 1 wt. % to 30 wt. % paraffins, from 1 wt. % to 20 wt. % BTEX, from 10 wt. % to 90 wt. % mono-aromatics, from 1 wt. % to 15 wt. % naphthalenes, from 1 wt. % to 30 wt. % indenes, from 1 wt. % to 15 wt. % mono-naphthenes, and from 1 wt. % to 60 wt. % dicyclopentadiene.

19. The multi-stage process of claim 1, wherein the heavy pyrolysis oil comprises mono-aromatics, di-aromatics, tri-aromatics, tetra-aromatics, penta-aromatics, hexa-aromatics, and hepta and greater aromatics.

* * * * *

UNITED STATES PATENT AND TRADEMARK OFFICE
CERTIFICATE OF CORRECTION

PATENT NO. : 12,227,706 B2  
APPLICATION NO. : 18/046034  
DATED : February 18, 2025  
INVENTOR(S) : Sun et al.

It is certified that error appears in the above-identified patent and that said Letters Patent is hereby corrected as shown below:

In the Claims

Claim 17, Column 18, Line 7, delete "pyrolysis oil comprises from from 1 wt. % to 20 wt. %" and insert --pyrolysis oil comprises from 1 wt. % to 20 wt. %"--.

Signed and Sealed this
Eighteenth Day of March, 2025

Coke Morgan Stewart
*Acting Director of the United States Patent and Trademark Office*